United States Patent [19]

Boisture

[11] Patent Number: 5,582,349
[45] Date of Patent: *Dec. 10, 1996

[54] HYDROBLASTING SPRAY GUN HAVING AN ON/OFF SAFETY SWITCH SYSTEM

[75] Inventor: Thomas B. Boisture, Baytown, Tex.

[73] Assignee: C. H. Heist Corp, Baytown, Tex.

[*] Notice: The term of this patent shall not extend beyond the expiration date of Pat. No. 5,535,949.

[21] Appl. No.: 538,140

[22] Filed: Oct. 2, 1995

Related U.S. Application Data

[63] Continuation-in-part of Ser. No. 450,795, May 25, 1995, Pat. No. 5,535,949.

[51] Int. Cl.$^6$ ............................................. B05B 11/00
[52] U.S. Cl. ............................................. 239/124
[58] Field of Search ............................. 239/124, 126, 239/DIG. 22; 251/31, 57; 137/637

[56] References Cited

U.S. PATENT DOCUMENTS

| | | | |
|---|---|---|---|
| 2,246,348 | 6/1941 | Coffey | 251/57 |
| 3,762,575 | 6/1972 | Hinrichs . | |
| 3,885,739 | 5/1975 | Tuttle | 239/124 |
| 4,216,911 | 8/1980 | Huperz et al. . | |
| 4,784,330 | 11/1988 | Hammelmann | 239/526 |
| 4,802,313 | 2/1989 | Smith . | |
| 5,199,642 | 4/1993 | Rankin | 239/124 |
| 5,238,191 | 8/1993 | Gaymon . | |
| 5,297,777 | 3/1994 | Yie . | |
| 5,349,982 | 9/1994 | Goldsmith | 239/124 X |

OTHER PUBLICATIONS

Heist 10M Double Deadman Control Assembly Drawings (8 pages) dated Circa 1990–1991.

*Primary Examiner*—Kevin Weldon
*Attorney, Agent, or Firm*—Pravel, Hewitt, Kimball & Krieger

[57] ABSTRACT

An improved hydroblasting gun having an on/off safety switch system. The on/off switch system comprises at least two actuatable triggers each displacing a specified volume of incompressible fluid which, when coupled with a predetermined volume within an actuator, displaces a piston initiating a signal. In specific application, two separate triggers are depressed displacing a predetermined volume in an actuator adjacent a shut-off valve. Until the actuator fully opens the shut-off valve, hydroblasting operations may not begin. In this manner, the chances of accidental discharge through the depression of a single trigger are eliminated and preferred ergonomical characteristics are provided.

9 Claims, 5 Drawing Sheets

HYDROBLASTING SPRAY GUN HAVING AN ON/OFF SAFETY SWITCH SYSTEM

RELATED APPLICATION

This patent application is a continuation-in-part of U.S. patent application Ser. No. 08/450,795, filed May 25, 1995, and entitled "Safety Switch System for Hydroblasting Operations", issuing as U.S. Pat. No. 5,535,949.

BACKGROUND OF THE INVENTION

1. Field of the Invention

This invention relates to a hydroblasting gun. More specifically, this invention relates to an improved hydroblasting spray gun having an on/off safety switch system.

2. Description of the Prior Art

High pressure water is used for a number of purposes. For example, in the more traditional applications of hydroblasting operations, it is used to clean industrial and commercial equipment such as heat exchangers in refineries, concrete pads and runways, and other commercial applications. In performing these cleaning operations, it is not uncommon to eject water at pressures on the order of 6,000–60,000 psi. Such pressures can cause serious injury to an operator. Therefore, there is a need in the industry to improve the safety of hydroblasting equipment used in close proximity to the operator.

The prior art discloses a number of safety mechanisms used on hydroblasting guns. Such prior art systems typically comprise the use of a mechanical lever or an electric switch in combination with a trigger. See, for example, U.S. Pat. Nos. 3,885,739; 4,216,911; and 4,802,313. Nos. 4,216,911 and 4,802,313 disclose the use of a mechanical lever which must be depressed to make a trigger operable. U.S. Pat. No. 3,885,739 discloses the use of an electric switch which must be engaged to make the trigger operable. However, these prior art devices can be tiresome to continuously operate and are not ergonomically designed. This can lead to early fatigue which can cause accidents.

Therefore, the need exists in the industry for an improved system which is easy and comfortable to activate for prolonged periods of time without undue fatigue.

SUMMARY OF THE INVENTION

The present invention is an improved hydroblasting spray gun having a base frame, a first actuatable trigger, a second actuatable trigger, an actuator housing in cooperation with the first and second actuatable trigger, and a shutoff valve to provide spontaneous on/off control for discharging of water or other liquids.

The first actuator includes a frame attached to the base frame, a lever supported within the actuator frame, a housing supported within the actuator frame, and a displaceable ram supported within the housing and in contact with the lever. Upon rotation or pivotal movement of the lever, the ram displaces a predetermined first volume of fluid within the housing.

The second actuatable trigger also includes a frame, a lever, a separate housing and a displaceable ram supported within that housing. The lever is in spaced relationship to the ram of the second trigger so that upon rotation or pivotal movement of the second lever, the ram within the housing of the second actuator trigger displaces a predetermined second volume of incompressible fluid within the housing of the second trigger.

The actuator includes a housing and a displacable piston supported within the actuator housing. The actuator housing is in fluid communication with the volumes of incompressible fluid displaced by the rams of the first and second triggers. A piston is supported within the actuator housing and is thereby displaced a predetermined third volume which is at least greater than either the first volume or the second volume so that upon displacement of the piston within the actuator housing by said predetermined third volume, a signal is generated.

The shut-off valve includes a housing having a sealing piston biased to a closed position and adapted to be contacted by the piston supported within the actuator housing. In this manner, upon displacement of the piston within the actuator housing by the predetermined third volume, the actuator piston contacts the biased piston within the shut-off valve housing and displaces the biased piston enabling actuation of the gun. In an alternate embodiment the piston within the actuator housing may be an integral part of the biased piston within the shut-off valve thereby still enabling the displacement of the biased piston for actuation of the gun.

The more important features of this invention have been summarized rather broadly in order that the detailed description may be better understood. There are, of course, additional features of the invention which will be described hereafter and which will also form the subject of the claims appended hereto.

BRIEF DESCRIPTION OF THE DRAWINGS

In order to more fully describe the drawings used in the detailed description of the present invention, a brief description of each drawing is provided.

DETAILED DESCRIPTION OF PREFERRED EMBODIMENT

Figure 1:
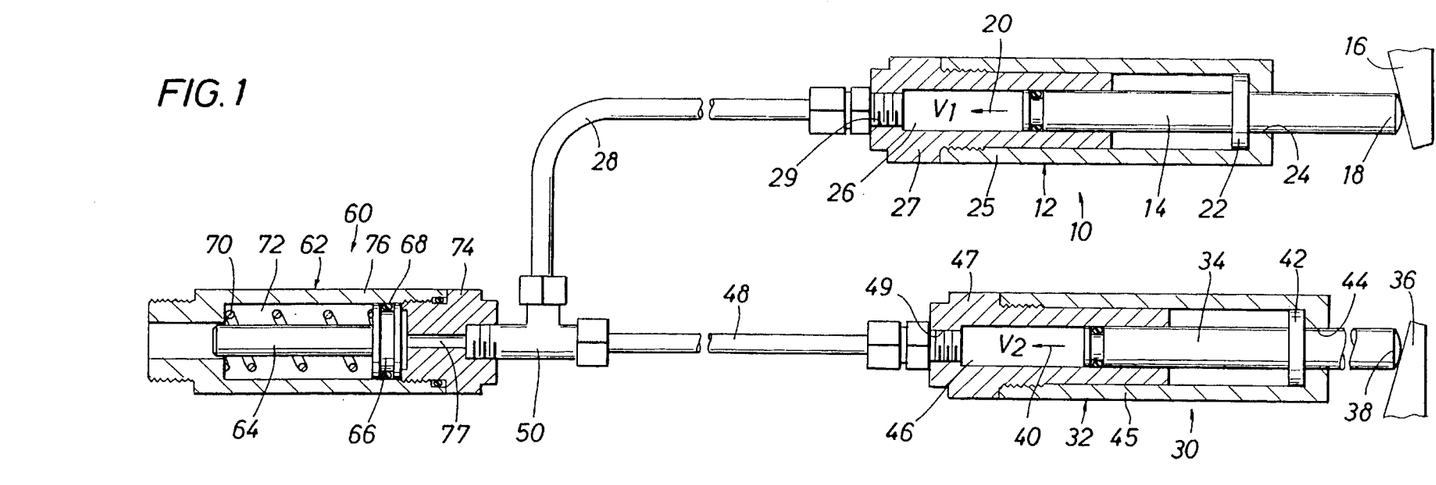
FIG. 1 is a schematic of a portion of the present invention with no triggers displaced.

Referring to FIG. 1, a first actuatable trigger 10 is shown having a housing 12 and a displacable ram 14 supported therein. Housing 12 includes an end cap 27 which is threadably engaged onto a cylindrical portion 25 of housing 12. Ram 14 is in contact with a lever 16 adapted to depress one end 18 of ram 14 and thereby move ram 14 in the direction of arrow 20. Ram 16 may include a lip portion 22 adapted to engage one end of housing 12 thereby prohibiting the further displacement of ram 14 to the right as shown in FIG. 1 through aperture 24 of housing 12. Preferably, the volume $V_1$ within space 26 of housing 12 is filled with an incompressible fluid, such as hydraulic fluid.

The present invention also includes a second actuatable trigger 30 virtually identical in structure and operation to first trigger 10. That is, it also includes a housing 32 having a ram 34 supported therein. One end 38 of ram 34 is in contact with a lever 36. Housing 32 also includes a cap portion 47 which is threadably engaged onto a cylindrical portion 45 of housing 32. Thus, upon pivotal movement of lever 36 to the left as shown in FIG. 1, ram 34 would be displaced in the direction of arrow 40. Ram 34 may also include a lip portion 42 which further prevents the movement of ram 34 to the right as shown in FIG. 1 through aperture 44 of housing 32. As in the case of the first actuatable trigger 10, the volume $V_2$ of space 46 within housing 32 is preferably filled with an incompressible fluid, such as hydraulic fluid.

Referring still to FIG. 1, a hollow conduit 28 is threadably engaged to one end 29 of housing 12. Similarly, a hollow conduit 48 is threadably engaged to one end 49 of housing 32. The other end of each conduit 28 and 48 is in fluid communication with one another through a T-section 50.

The present invention also includes an actuator 60 having a housing 62 and a piston 64 supported therein. Piston 64 includes a head portion 66 having an O-ring 68 which serves to provide a seal between either side of head 66. Actuator 60 includes a spring 70 supported within space 72 of housing 62. Spring 70 serves to bias piston 64 to the right of housing 62 as shown in FIG. 1. Housing 62 includes a cap section 74 which is threadably engaged to the cylindrical portion 76 of housing 62. Cap section 74 includes a through bore 77. T-section 50 is threadably attached to cap section 74 at base 77. Thus, space 26 of housing 12 and space 46 of housing 32 are in fluid communication through T-section 50 with head 66 within housing 62.

Figure 2:
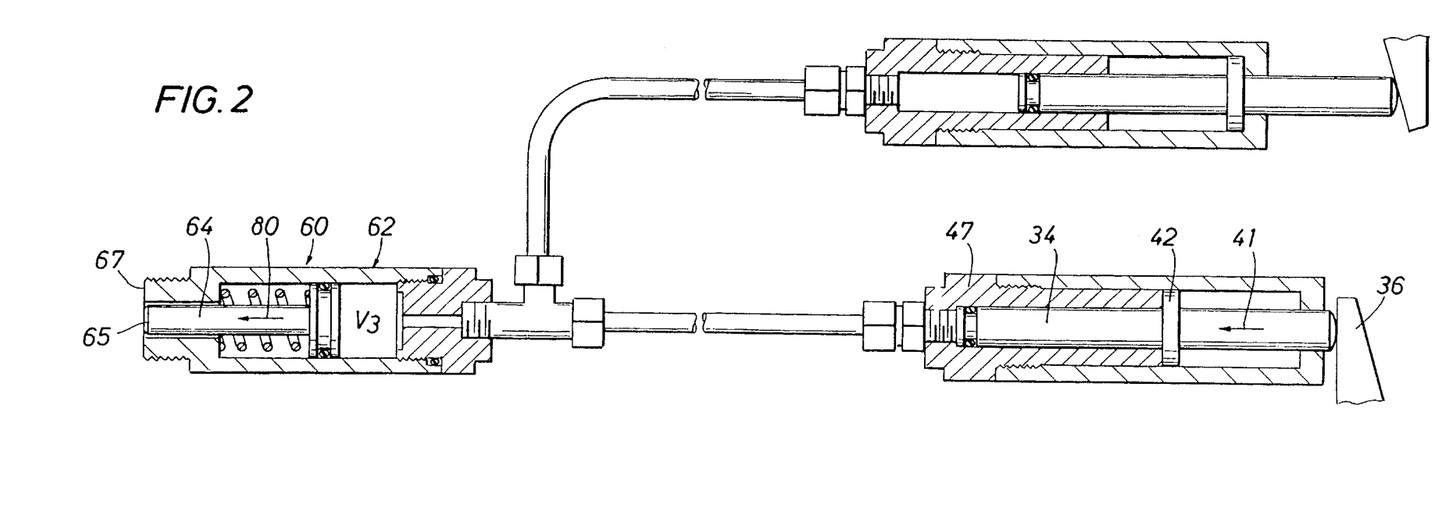
FIG. 2 is a schematic of a portion of the present invention with one trigger depressed.
Figure 3:
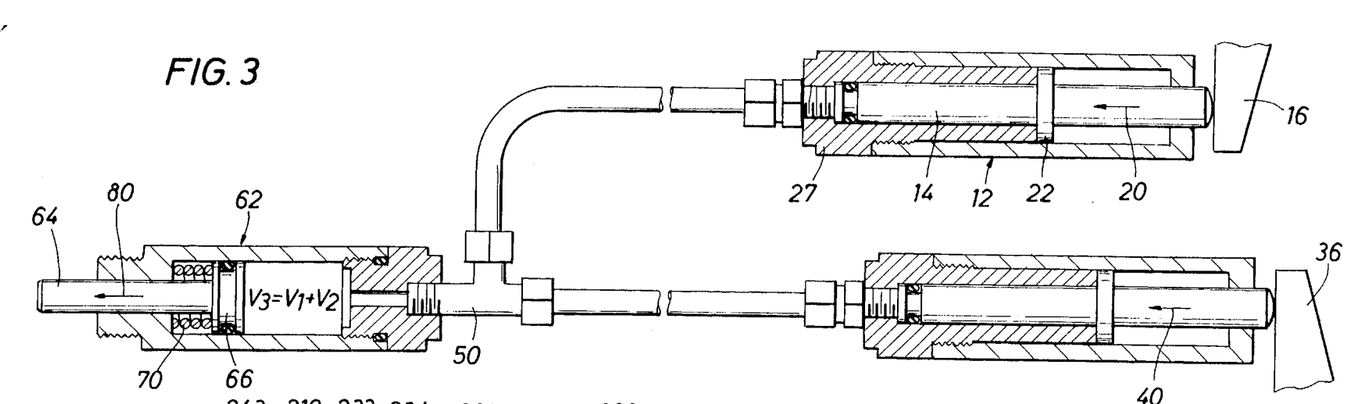
FIG. 3 is a schematic of a portion of the present invention with both triggers depressed.

Referring now to FIGS. 2 and 3, the operation of the present invention is further illustrated. In FIG. 2, lever 36 has been pivoted to the left displacing ram 34 in the direction of arrow 41. As shown, ram 34 has been fully displaced to the left enabling lip portion 42 to contact cap portion 47 of housing 32. Therefore, as shown, upon full displacement of ram 34 to the left in the direction of arrow 41, the volume $V_2$ of hydraulic fluid has been displaced out of housing 32. Thus, as shown, displaced volume $V_2$ (see FIG. 1) is equivalent to volume $V_3$ of actuator 60 as shown in FIG. 2, since the incompressible fluid which previously occupied volume $V_2$ has been displaced to volume $V_3$. The length of piston 64 is selected so that upon displacement of piston 64 equivalent to volume $V_a$ as shown in FIG. 2, the tip 65 of piston 64 is at or slightly beyond the edge 67 of housing 62.

Referring now to FIG. 3, first lever 16 is shown having fully displaced ram 14 until lip 22 engages cap 27 of housing 12. At this point, the volume $V_1$ of incompressible fluid has been displaced out of housing 12. That fluid has been introduced into volume $V_3$ of housing 62. Therefore, as shown in FIG. 3 with both the first and second triggers fully depressed, the maximum displacement permitted is $V_3=V_1+V_2$. In this final position, spring 70 is fully compressed and piston 64 has been fully extended to the left in the direction of arrow 80.

In FIG. 2, piston 64 has been displaced to the point it begins to exit past edge 67 of housing 62 and a signal is capable of being generated at that point based on the further extension of piston 64 to the left in the direction of arrow 80 until piston 64 is fully extended as shown in FIG. 3. As further described below, between the stages shown in FIG. 2 and FIG. 3 (when the maximum displacement of piston 64 has occurred), volume $V_3$ will gradually increase permitting the progressive extension of piston 64 from the position shown in FIG. 2 to the final position shown in FIG. 3.

Additionally, the ergonomics can be improved by adjusting the diameter of rams 14 and 34 compared to the diameter of head 66 of piston 64. Since an operator may have to hold levers 16 and 36 for several minutes at a time over a normal workday, it is preferable to provide a resistant load to the displacement of rams 14 and 34 which does not fatigue the operator. Accordingly, it is preferable that the diameters of rams 14 and 34 are smaller than the diameter of head 66. Preferably, the diameter of each ram 14 and 34 is between about 0.5 and 0.6 the diameter of head 66. Thus, the stroke distance of ram 14 required to create a volume $V_1$ is between about 4.0 and 2,777 times, respectively, the stroke distance required of piston head 66 to result in the same volume $V_3$ in actuator 60. In this manner, the trigger force required of an operator to displace lever 16 to result in a given displacement of head 66 is significantly less, and therefore more ergonomical. Additionally, due to the sensitivity of actuator 60 since displacement of piston 64 is significantly less than the displacement of either ram 14 or 34 based on this diametric relationship, actuator 60 can be adjusted to be particularly sensitive to displacements of each trigger. By the same token, the system is more forgiving of an operator's minor displacement of each ram 14 and 34 since minor displacements of the ram will result in virtually little or no displacement of head 66.

Figure 4:
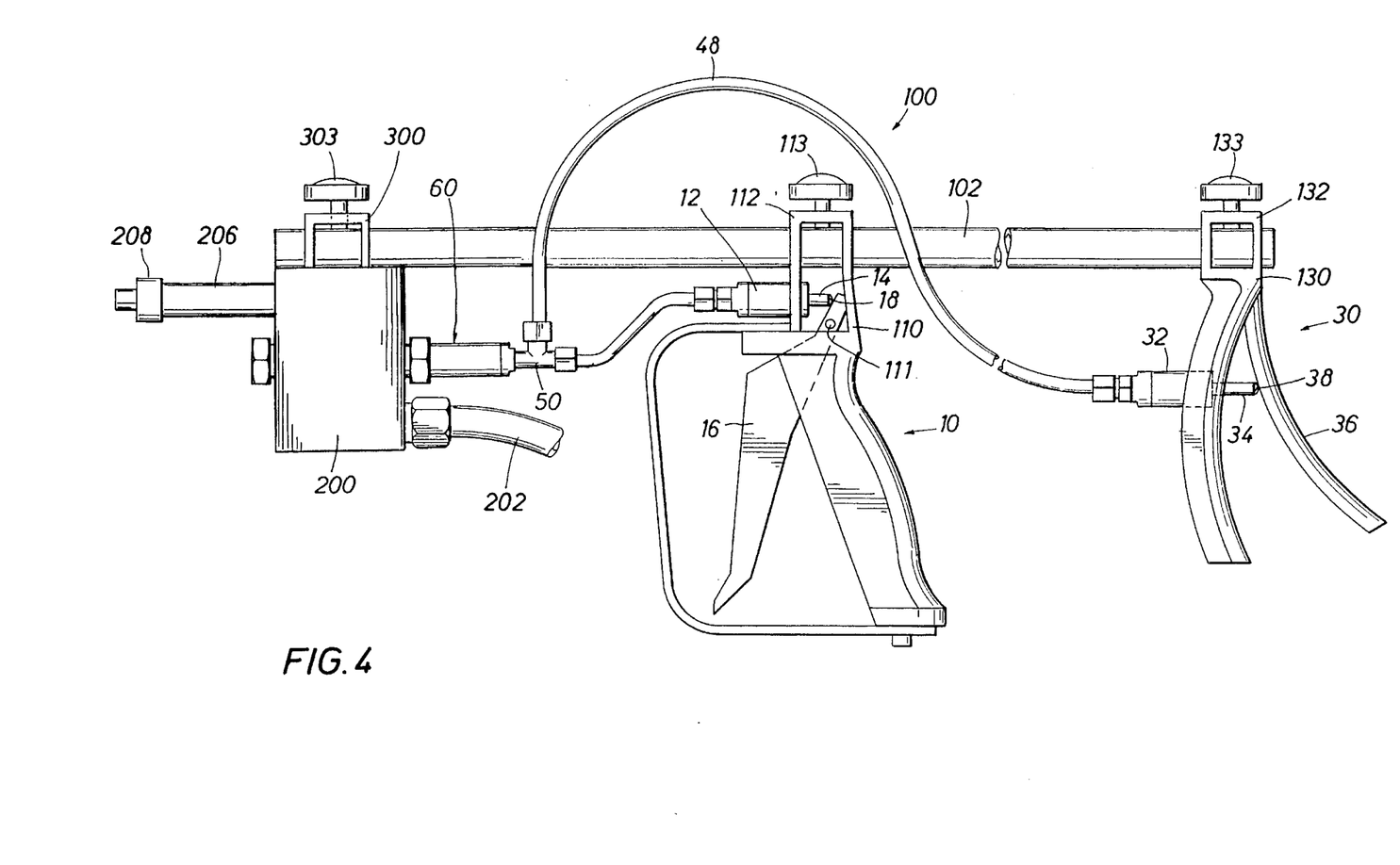
FIG. 4 is an elevation view of the present invention.

Referring now to FIG. 4, the system of FIG. 1 is shown incorporated within a hydroblasting gun 100. Hydroblasting gun 100 includes a base longitudinal member 102 which is the principal support member of the gun. A first trigger 10 is shown having an adjustable frame 110 adapted to be attached to base member 102. Frame 110 includes an upper portion 112 having a threaded screw 113 which passes through the top of upper portion 112 and engages member 102. In this manner, frame 110 can be relocated along base member 102. Housing 12 of FIG. 1 is shown supported within frame 110. Lever 16 is pivotally attached at pivot point 111 to frame 110 and contacts end 18 of ram 14. Conduit 28 is shown exiting one end of housing 12 and engaging T-section 50.

Second trigger 30 also includes a frame structure 130 having an upper portion 132 which includes a threaded screw 133 that passes through upper portion 132 and is adapted to engage base member 102. As in the case of screw 113, screw 133 can also be loosened permitting the relocation of frame 130 relative to base member 102 and then screw 133 can be tightened securing its position. The repositioning of the first and second triggers 10 and 30 serve to further improve the ergonomics of the present invention for the particular operator.

Referring still to FIG. 4, lever 36 is shown pivotally connected within frame 130 and contacting end 38 of ram 34. Housing 32 is supported within frame 130. Conduit 48 is attached at one of housing 32 and at the other end to T-member 50 as discussed above with respect to FIG. 1. Conduits 28 and 48 include sufficient slack to enable the readjustment of frames 110 and 130 along base member 102.

Actuator 60 is shown in fluid communication with T-member 50 and secured to an adjustable shut-off valve 200. Shut-off valve 200 includes an upper frame portion 300 having an adjustable screw 303 passing therethrough which permits the readjustment of shut-off valve 200 relative to base member 102.

Figure 6:
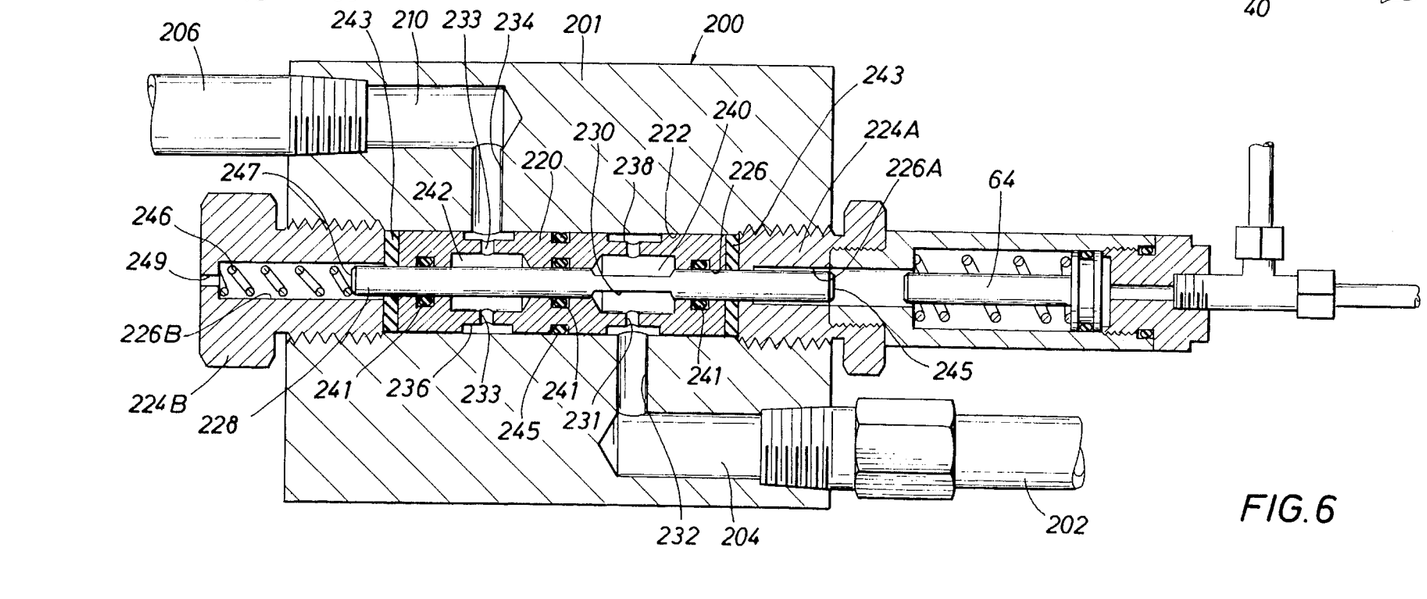
FIG. 6 is a cross-sectional detail of the shut-off valve and actuator portions of the present invention.

Referring to FIG. 6 and FIG. 4, the operation of shut-off valve 200 will be further discussed. Shut-off valve 200 includes a housing 201 shown in cross-section in FIG. 6. Housing 201 includes first bore 204 adapted to receive a conduit 202 through which water flows for the hydroblasting operation. Housing 201 includes a second bore 210 generally opposite bore 204. A pipe 206 is threadably connected to one end of bore 210. A nozzle 208 is attached at the other end of pipe 206. Housing 201 also includes a central bore 222 which extends throughout the length of housing 201. Each end of bore 222 is threaded to receive plugs 224A and 224B. A cylindrical sleeve 220 is supported within bore 222. Cylindrical sleeve 220 includes an internal bore 226 adapted to receive a piston 228. Piston 228 includes a recessed portion 230. Central bore 222 is in fluid communication with bore 204 through transverse bore 232. Similarly, central bore 222 is in fluid communication with bore 210 through transverse bore 234. Cylindrical sleeve 220 includes recessed outer lip portion 236 and 238. Recessed portions 236 and 238 are ring-shaped which circumscribe the outer diameter of sleeve 220. Sleeve 220 is configured to include a first chamber 240 and a second chamber 242. Sleeve 220 also includes bores 231 which provides fluid communication from bore 232 to chamber 240. Similarly, sleeve 220 includes bore 233 which provides fluid communication between chamber 242 and bore 210. Piston 228 sealably engages within bore 222. Sleeve 220 may include packing elements 241 to provide a seal between piston 228 and sleeve 220. Similarly, sleeve 220 may include end packers 243 to seal piston 228 within bore 222 and to seal sleeve 220 within bore 222. O-ring 245 serves to seal sleeve 220 within bore 222 between chambers 240 and 242.

End cap 224A includes a bore 226A which coincides with bore 226 of sleeve 220. As shown in FIG. 6, bore 226A coincides with the central bore of actuator 62 permitting piston 64 to contact end 245 of piston 228 as further discussed below.

Similarly, end cap 224B includes a central bore 226B which generally coincides with bore 226 of sleeve 220. A spring 246 is positioned within bore 226A to provide compressive force against end 247 of piston 228 as discussed below. End cap 224B may include a vent hole 249 to discharge air during movement of piston 228 within bore 226.

Figure 7:
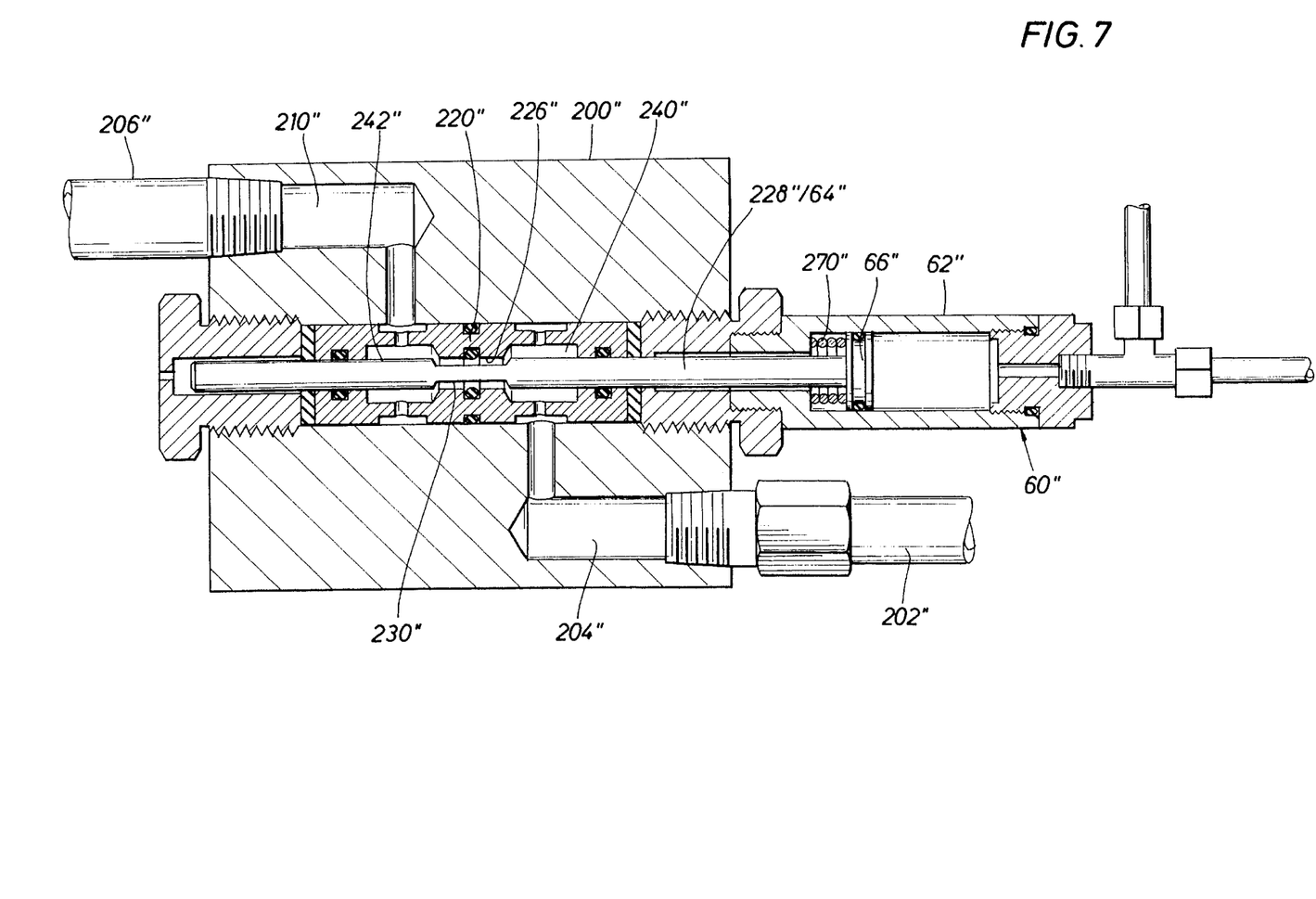
FIG. 7 is an alternate embodiment of a cross-sectional detail of the shut-off valve and actuator portion of the present invention.

FIG. 6 shows shutoff valve 200 in a closed position. That is, water available through conduit 202 is permitted to pass through bores 204, 232, 231 and enter chamber 240. However, because piston 228 is seated against sleeve 220, fluid cannot pass through and into second chamber 242 and exit through bores 233, 234, and 210 out pipe 206 and nozzle 208. If either the first or second trigger is displaced as shown in FIG. 6, volume $V_3$ will equal volume $V_1$ or $V_2$ and end 65 of piston 64 is advanced just to the edge 67 of housing 62 as shown in FIG. 2. In this position, end 65 of piston 64 would just contact end 245 of piston 228. As the second trigger is depressed, additional fluid enters $V_3$ extending end 65 of piston 64 to the left in the direction of arrow 80 as shown in FIG. 2 thereby advancing piston 228 to the left with respect to FIG. 6. As piston 228 advances to the left, recessed portion 230 enters the central portion of sleeve 220 and once the leading edge of recessed portion 220 enters chamber 242, fluid communication is established between chambers 240 and 242 thereby permitting the flow of high pressure water from conduit 202 through bores 204, 232, 231, chamber 240 and into chamber 242 and out through bores 233, 234, 210 into pipe 206. In this configuration, the shutoff valve is in the open position and the hydroblasting spray gun is operational. The open mode is shown in FIG. 7 with respect to an alternate embodiment as further described below.

When neither lever 16 nor 36 is depressed and hydraulic gun 100 is idle, water in conduit 202 terminates within chamber 240. Once the operator elects to begin a hydroblasting operation, either lever 16 or lever 36 is depressed. In the embodiment shown in FIG. 4, it is more likely that lever 36 is depressed first since it is positioned against the operator's shoulder. Assuming that to be the case, lever 36 is depressed first resulting in the displacement of incompressible fluid volume $V_2$ into volume $V_3$ as shown in FIG. 2. Once this happens, the end 65 of piston 64 contacts end 245 of piston 228. The operator may then begin to squeeze lever 16 gradually displacing piston 14. As the operator squeezes lever 16, a larger volume of incompressible fluid is introduced into volume $V_3$ eventually resulting in the position shown in FIG. 3 which would in turn open shut-off valve 200 and permit hydroblasting operations.

Figure 5:
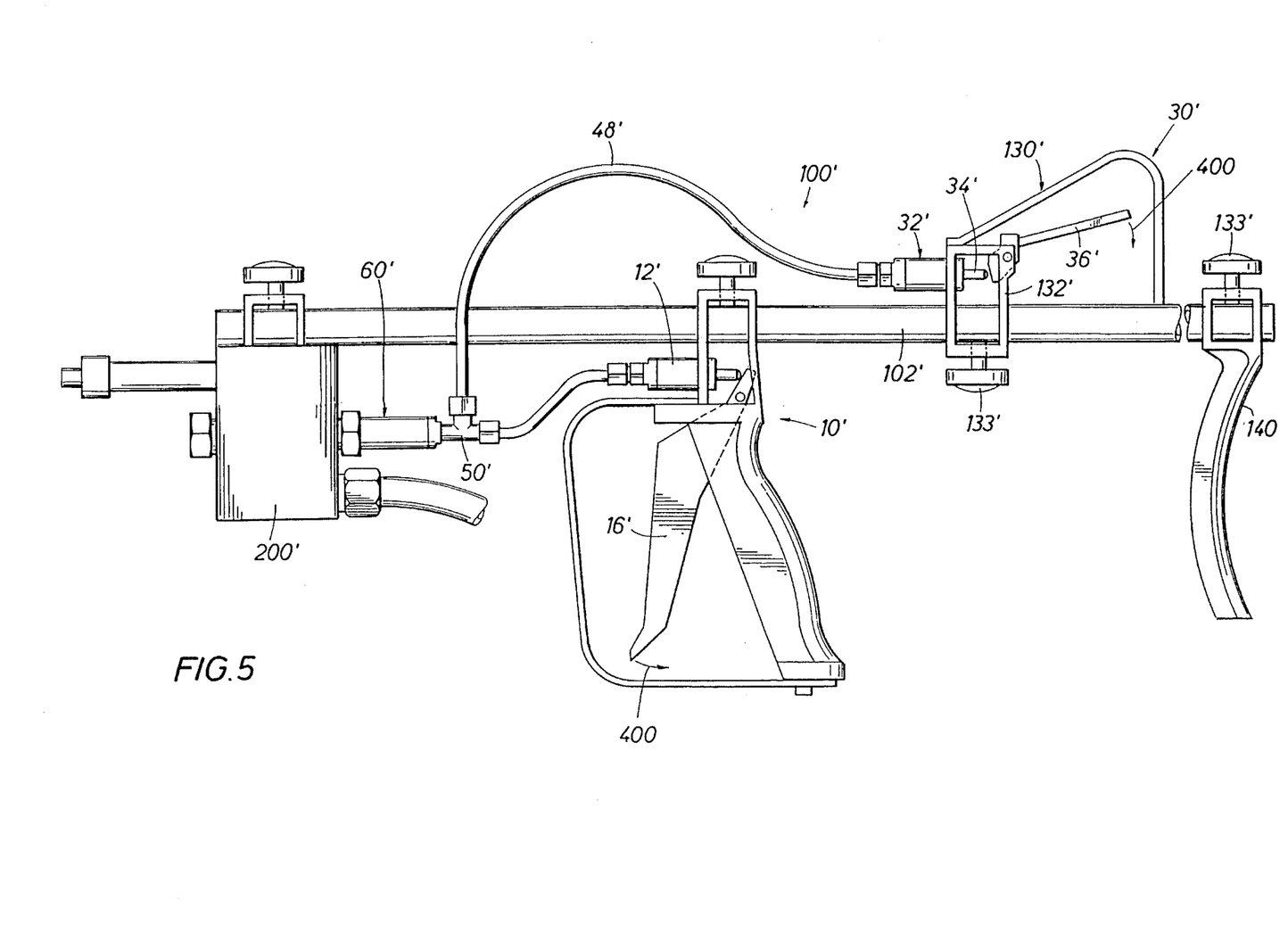
FIG. 5 is a modification of a portion of the present invention.

An alternate embodiment for a hydroblasting spray gun embodying the present invention is shown in FIG. 5. This embodiment includes a conduit 48' connecting a housing 32' with a T-section 50' as in the preferred embodiment. Similarly, conduit 28' connects housing 12' with T-section 50'. An actuator 60' is connected to T-section 50' and interconnects with shut-off valve 200'. Other than the restructuring of the frame portion of second trigger 30', the remaining elements of this embodiments are identical in structure and operation to the preferred embodiment.

In the operation of the alternate embodiment, the operator may select to depress either lever 16' or lever 36' in the direction of arrows 400 to initiate operation. The operator may elect to depress both levers simultaneously which would gradually increase volume $V_3$ equivalent to the spontaneous displacement at any point in time equal to $V_1+V_2$.

Referring now to FIG. 7, an alternate embodiment of the shut-off valve as shown in FIG. 6 is depicted. This alternate embodiment of the shut-off valve in combination with an alternate embodiment of the actuator 60 could be used for either embodiment of a hydroblasting gun as shown in FIGS. 4 and 5. In this alternate embodiment of shutoff valve 200", actuator 60" still includes a housing 62" as disclosed above with respect to FIGS. 1–3. A piston 64" is supported within housing 62" but is an integral part of piston 228" of shutoff valve 200". In this alternate embodiment, piston 64" and piston 228" may be manufactured as a single unit. Spring 270" serves to bias piston 228"/64" to the right as shown in FIG. 7. Except for the manufacture of piston 228"/64" as a single unit, the remaining components of this alternate embodiment for shutoff valve 200" and actuator 60" are identical in structure and operation.

Referring still to FIG. 7, but in combination with FIGS. 1–3, actuation of a first trigger 10 would displace piston 228"/64" a volume $V_3$ equivalent to the displaced volume $V_1$ of first trigger 10. Such a first displacement would serve to compress spring 270" and displace piston 228"/64" to the left a portion of the total stroke distance. Then, as second trigger 30 is activated, piston 228"/64" is further displaced to the left as shown in FIG. 7 until the lever of second trigger 30 is fully displaced at which point piston 228"/64" is fully displaced to the left. In FIG. 7 piston 228"/64" has been fully compressed the equivalent of $V_1+V_2$, as shown in FIG. 3. In this position, recessed portion 230" of piston 28"/64" has been fully advanced to the left as shown in FIG. 7 permitting fluid communication between chambers 240" and 242". Thus, water is now free to flow from conduit 202" through bore 204" into chamber 240" through bore 226" adjacent recessed portion 230" into chamber 242" and through bore 210" into pipe 206". At this point the hydroblasting gun is fully operational. It may be desirable to position recessed portion 230" such that fluid communication is established between chambers 240" and 242" before the full extension of piston 228"/64" to the left as shown in FIG. 7. This may be advantageous for ergonomical reasons in certain applications if it is not desirable for the operator to fully compress the second trigger for the spray gun to be operational. Due to the configuration of recessed portion 230", once fluid communication is established between chambers 240" and 242", the gun is fully operational instantaneously. In this respect this shut-off valve acts as an off/on switch. This instantaneous action is achieved in the preferred embodiment of the shut-off valve as shown in FIG. 6 as well as the alternate embodiment as shown in FIG. 7.

Obviously, modifications and alternations to the embodiments disclosed herein will be apparent to those skilled in the art in view of this disclosure. However, it is intended that all such variations and modifications fall within the spirit and scope of this invention as claimed.

What is claimed is:

1. A hydroblasting spray gun comprising:
   a base member;
   a first actuatable trigger having:
      a frame attached to said base,
      a lever supported within said frame,
      a housing supported within said frame, and
      a displacable ram supported within said housing and in contact with said lever so that upon movement of said lever, said ram displaces a predetermined first volume of fluid within said housing;
   a second actuatable trigger having:
      a frame attached to said base,
      a lever supported within said frame,
      a housing supported within said frame, and
      a displacable ram supported within said housing and in contact with said lever so that upon movement of said lever, said ram displaces a predetermined second volume of fluid within said housing;
   an actuator having a housing and a piston supported within said housing, said housing being in fluid communication with said displaced volumes of fluid of said first and second triggers, and said piston being adapted to be displaced within said housing of said actuator a predetermined third volume greater than said first volume or said second volume; and
   a shut-off valve having a housing and a sealing piston biased to a closed position supported within said housing of said shut-off valve, said actuator housing being attached to said shut-off valve housing so that said piston of said actuator contacts said sealing piston upon displacement of said piston of said actuator by said predetermined third volume and said piston of said actuator further displaces said sealing piston to an open position enabling actuation of said gun.

2. The hydroblasting spray gun according to claim 1 wherein the diameter of said displacable ram of said first actuatable trigger and the diameter of said displacable ram of said second actuatable trigger are substantially equal.

3. The hydroblasting spray gun according to claim 2 wherein said piston of said actuator includes a head portion having a diameter greater than the diameter of said rams of said first and second actuatable triggers.

4. A hydroblasting spray gun comprising:
   a base member;
   a first actuatable trigger having:
      an adjustable frame attached to said base,
      a lever supported within said frame,
      a housing supported within said frame, and
      a displacable ram supported within said housing and in contact with said lever so that upon movement of said lever, said ram displaces a predetermined first volume of fluid within said housing;
   a second actuatable trigger having:
      an adjustable frame attached to said base,
      a lever supported within said frame,
      a housing supported within said frame, and
      a displacable ram supported within said housing and in contact with said lever so that upon movement of said lever, said ram displaces a predetermined second volume of fluid within said housing;
   an actuator having a housing and a piston supported within said housing, said housing being in fluid communication with said displaced volumes of fluid of said first and second triggers, and said piston being adapted to be displaced within said housing of said actuator a predetermined third volume substantially equal to said first volume and said second volume; and
   a shut-off valve having a housing and a sealing piston biased to a closed position supported within said housing of said shut-off valve, said actuator housing being attached to said shut-off valve housing so that said piston of said actuator contacts said sealing piston and displaces said sealing position to an open position within said shut-off valve housing upon displacement of said piston of said actuator by said predetermined third volume thereby enabling actuation of said gun.

5. A hydroblasting spray gun comprising:
   a base member;
   a first actuatable trigger having:
      an adjustable frame attached to said base,
      a lever supported within said frame,
      a housing supported within said frame, and
      a displacable ram supported within said housing and in contact with said lever so that upon movement of said lever, said ram displaces a predetermined first volume of fluid within said housing;
   a second actuatable trigger having:
      an adjustable frame attached to said base,
      a lever supported within said frame,
      a housing supported within said frame, and
      a displacable ram supported within said housing and in contact with said lever so that upon movement of said lever, said ram displaces a predetermined second volume of fluid within said housing;
   an actuator having a housing and a piston supported within said housing, said housing being in fluid communication with said displaced volumes of fluid of said first and second triggers, and said piston being adapted to be displaced within said housing of said actuator a predetermined third volume greater than said first volume or said second volume; and
   a shut-off valve having a housing and a sealing piston biased to a closed position supported within said housing of said shut-off valve and attached to said piston of said actuator so that upon displacement of said piston of said actuator by said predetermined third volume said sealing piston advances to an open position enabling actuation of said gun.

6. The hydroblasting spray gun according to claim 5 wherein the diameter of said displacable ram of said first actuatable trigger and the diameter of said displacable ram of said second actuatable trigger are substantially equal.

7. The hydroblasting spray gun according to claim 6 wherein said piston of said actuator includes a head portion having a diameter greater than the diameter of said rams of said first and second actuatable triggers.

8. The hydroblasting spray gun according to claim 6 wherein said piston of said actuator includes a head portion having a diameter about twice the diameter of said rams of said first and second actuatable triggers.

9. A hydroblasting spray gun comprising:

a base member;

a first actuatable trigger having:
   an adjustable frame attached to said base,
   a lever supported within said frame,
   a housing supported within said frame, and
   a displacable ram supported within said housing and in contact with said lever so that upon movement of said lever, said ram displaces a predetermined first volume of fluid within said housing;

a second actuatable trigger having:
   an adjustable frame attached to said base,
   a lever supported within said frame,
   a housing supported within said frame, and
   a displacable ram supported within said housing and in contact with said lever so that upon movement of said lever, said ram displaces a predetermined second volume of fluid within said housing;

an actuator having a housing and a piston supported within said housing, said housing being in fluid communication with said displaced volumes of fluid of said first and second triggers, and said piston being adapted to be displaced within said housing of said actuator a predetermined third volume substantially equal to said first volume and said second volume; and a shut-off valve having a housing and a sealing piston biased to a closed position supported within said housing of said shut-off valve and attached to said piston of said actuator so that upon displacement of said piston of said actuator by said predetermined third volume said sealing piston advances to an open position enabling actuation of said gun.

* * * * *